(12) United States Patent
Todoli

(10) Patent No.: US 10,948,883 B2
(45) Date of Patent: Mar. 16, 2021

(54) MACHINE LOGIC CHARACTERIZATION, MODELING, AND CODE GENERATION

(71) Applicant: Rockwell Automation Technologies, Inc., Mayfield Heights, OH (US)

(72) Inventor: Andreu Cuartiella Todoli, Barcelona (ES)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 333 days.

(21) Appl. No.: 15/709,590

(22) Filed: Sep. 20, 2017

(65) Prior Publication Data

US 2019/0086880 A1  Mar. 21, 2019

(51) Int. Cl.
*G05B 13/04* (2006.01)
*G05B 13/02* (2006.01)
*G05B 17/02* (2006.01)
*G05B 19/05* (2006.01)

(52) U.S. Cl.
CPC ....... *G05B 13/042* (2013.01); *G05B 13/0265* (2013.01); *G05B 17/02* (2013.01); *G05B 19/056* (2013.01); *G05B 2219/25298* (2013.01)

(58) Field of Classification Search
CPC .. G05B 13/042; G05B 13/0265; G05B 17/02; G05B 19/056; G05B 2219/25298
USPC .......................................................... 703/20
See application file for complete search history.

(56) References Cited

U.S. PATENT DOCUMENTS

| | | | | |
|---|---|---|---|---|
| 6,564,194 B1* | 5/2003 | Koza | ...................... | G05B 11/42 |
| | | | | 706/13 |
| 8,291,374 B2* | 10/2012 | Cullum | ..................... | G06F 8/51 |
| | | | | 717/106 |
| 8,949,772 B1* | 2/2015 | Talby | ........................ | G06F 8/35 |
| | | | | 717/104 |
| 8,972,327 B2* | 3/2015 | Baudel | ..................... | G06N 5/02 |
| | | | | 706/47 |
| 2004/0117624 A1* | 6/2004 | Brandt | ................ | H04L 63/1408 |
| | | | | 713/166 |
| 2009/0125878 A1* | 5/2009 | Cullum | ..................... | G06F 8/51 |
| | | | | 717/106 |
| 2018/0075354 A1* | 3/2018 | Averboch | ............... | G06N 20/00 |
| 2018/0136617 A1* | 5/2018 | Xu | .......................... | G05B 17/02 |
| 2018/0259923 A1* | 9/2018 | De | ..................... | G05B 19/0423 |

(Continued)

OTHER PUBLICATIONS (William Durand and Sebastien Salva, "Passive testing of production systems based on model inference.", IEEE 2015, pp. 138-147) (Year: 2015).*

(Continued)

*Primary Examiner* — Rehana Perveen
*Assistant Examiner* — Justin C Mikowski

(57) ABSTRACT

Techniques to facilitate generation of controller application code that emulates functionality of an industrial controller are disclosed herein. In at least one implementation, a computing system interfaces with the industrial controller and monitors input and output states of the industrial controller while the industrial controller operates a machine system. The input and output states of the industrial controller used to operate the machine system are analyzed to generate a functional design specification for the industrial controller. The controller application code that emulates the functionality of the industrial controller is generated based on the functional design specification.

20 Claims, 5 Drawing Sheets

(56) References Cited

U.S. PATENT DOCUMENTS

2018/0356793 A1* 12/2018 Kanemaru ......... G05B 19/4083
2019/0028545 A1*  1/2019 Yang ..................... H04W 4/00
2019/0056722 A1*  2/2019 Abbaszadeh .......... G06F 21/55
2019/0297095 A1*  9/2019 Formby ............... G05B 19/058

OTHER PUBLICATIONS (Sebastien Salva and William Durand, "Domain-Driven Model Inference Applied to Web Applications." 2014 International Conference on Software Engineering Research and Practice (SERP14), Jul. 2014, Las Vegas, United States. pp. 1-8) (Year: 2014).*
(William Durand and Sebastien Salva, "Inferring models with rule-based expert systems.", SoICT '14 Dec. 4-5, 2014, Hanoi , Viet Nam pp. 1-10) (Year: 2014).*
Anna Paula Estrada-Vargas et al., "A Black-Box Identification Method for Automated Discrete-Event Systems", IEEE Transactions on Automation Science and Engineering, Jul. 2017, 1321-1336, vol. 14 No. 3.
Italia Jimenez et al., "Synthesis of Ladder Diagrams from Petri Nets Controller Models", Proceedings of the 2001 IEEE International Symposium on Intelligent Control, Sep. 5-7, 2001, 225-230, Mexico City Mexico.
Mohammed Bani Younis et al., "UML-based Approach for the Re-Engineering of PLC Programs", Department of Electrical and Computer Engineering University of Kaiserslautern, 2006, 3691-3696, Kaiserslautern Germany.

\* cited by examiner

MACHINE LOGIC CHARACTERIZATION, MODELING, AND CODE GENERATION

TECHNICAL FIELD

Aspects of the disclosure are related to computing hardware and software technology.

TECHNICAL BACKGROUND

Industrial automation environments utilize various machines during the industrial manufacturing process, such as drives, pumps, motors, and robots. These machines have various moving parts and other components that are driven by instructions received from industrial controller systems. Machine builders, Solution Providers, and other content creators typically produce the control logic needed to run on these controllers to control the machines.

Industrial environments also commonly include a Human-Machine Interface (HMI). An HMI typically receives and processes the status data from the machines to generate various graphical displays, which may indicate the current and historical performance of the machines. In traditional implementations, the HMI may also provide a mechanism for an operator to send control instructions to a control system that controls the machines. For example, an operator might use the HMI to direct the control system to update drive parameters, turn on a pump, speed-up a motor, or stop a robot.

OVERVIEW

Techniques to facilitate generation of controller application code that emulates functionality of an industrial controller are disclosed herein. In at least one implementation, a computing system interfaces with the industrial controller and monitors input and output states of the industrial controller while the industrial controller operates a machine system. The input and output states of the industrial controller used to operate the machine system are analyzed to generate a functional design specification for the industrial controller. The controller application code that emulates the functionality of the industrial controller is generated based on the functional design specification.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
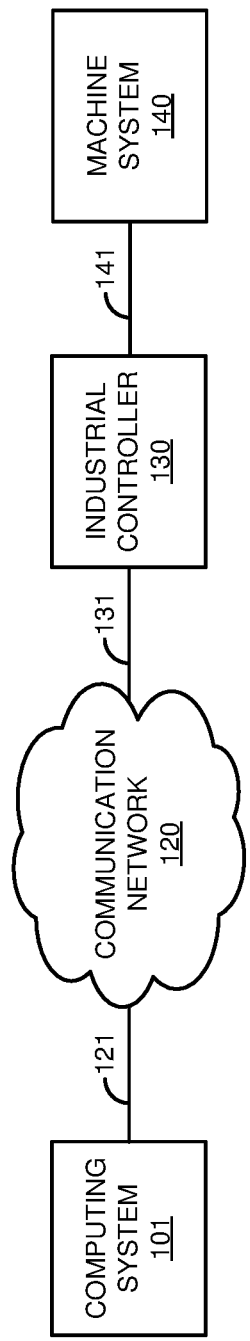
FIG. 1 is a block diagram that illustrates a communication system in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

As logic controller systems age and approach obsolescence, it is often desirable to migrate an older system to an updated version or to a completely new system altogether. However, depending on the age of the controller system and other factors, the logic code that it executes may be partially or fully unreadable or inaccessible, contain little to no comments, and have poor documentation, all of which pose significant challenges in migrating to a replacement system. Without full access to the code, developers must resort to time consuming methods of manually observing how a machine works, studying system documentation and operation manuals, searching for specific knowledge on that machine type or process, drafting a functional specification or requirements specification, and ultimately writing new code from scratch. Unfortunately, this is a very lengthy and high-cost approach that requires specific knowledge and skills to perform.

Implementations disclosed herein provide for a system that can model and characterize the logic to run any machine by collecting and analyzing data from observing inputs and outputs of a controller to determine the relationship between inputs, outputs, and time. Based on the analysis of the inputs and outputs, a functional design specification of the machine can be created and used to generate code that recreates the same working modes and logic used by the controller to drive the machine. In at least one implementation, the data analysis and code generation is performed in the cloud by sending the input and output observations over time to a cloud-based analysis service that may utilize artificial intelligence, machine learning, or deep learning techniques to generate the functional design specification and the application program code. When generating the application code, the system attempts to incorporate subsystems, basic automation sequences and routines, predefined code blocks, and other standard code libraries to facilitate human comprehension and readability of the code. To validate the generated code, human feedback can be employed to help train the system, along with fully automated validation by comparing the target system output and the emulated system output to verify that the generated code is functioning accurately.

Figure 2:
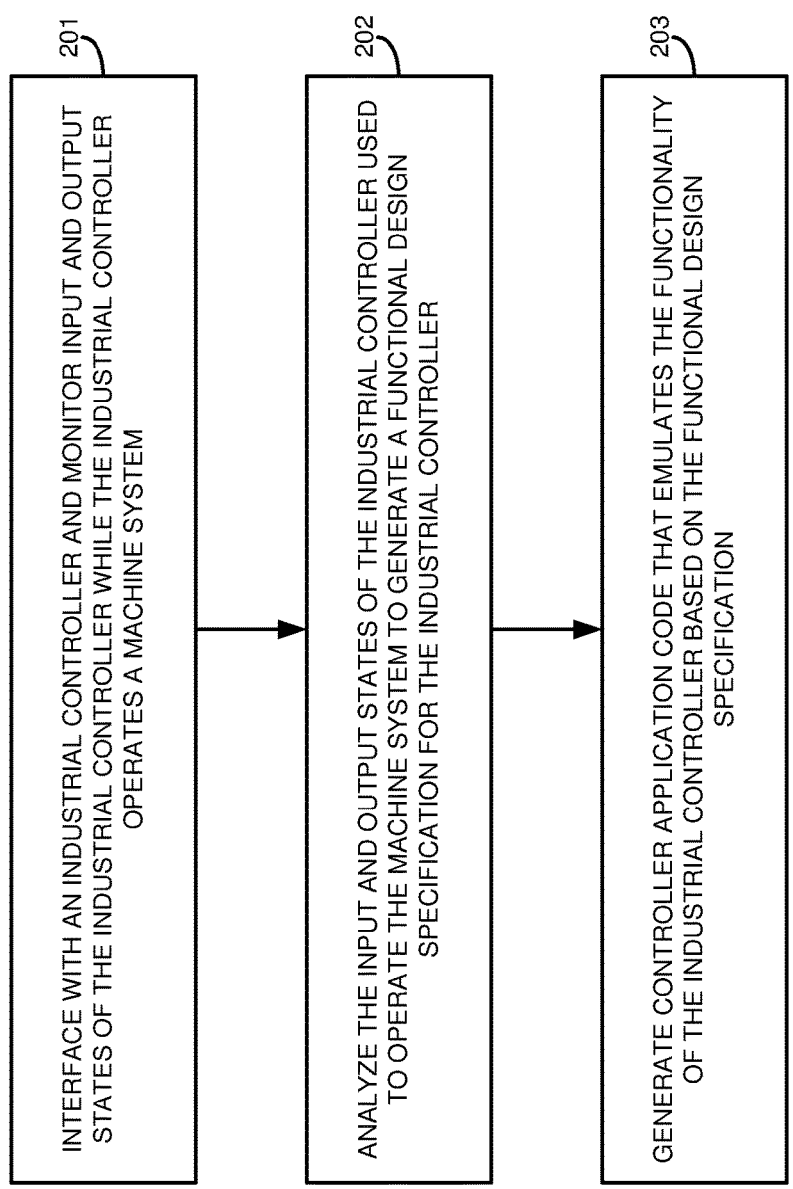
FIG. 2 is a flow diagram that illustrates an operation of a computing system in an exemplary implementation.
Figure 3:
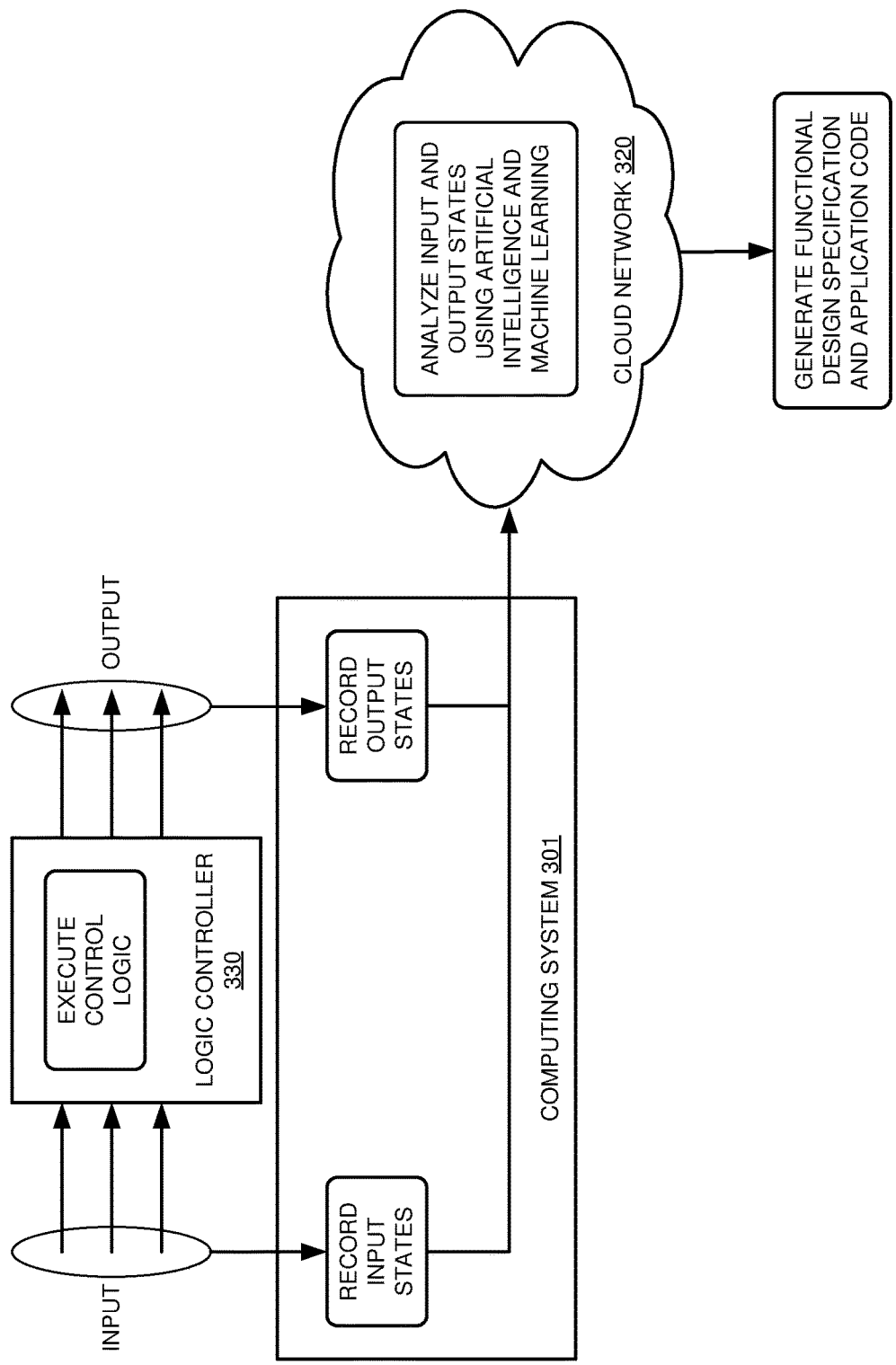
FIG. 3 is a block diagram that illustrates an operation of a communication system in an exemplary implementation.
Figure 4:
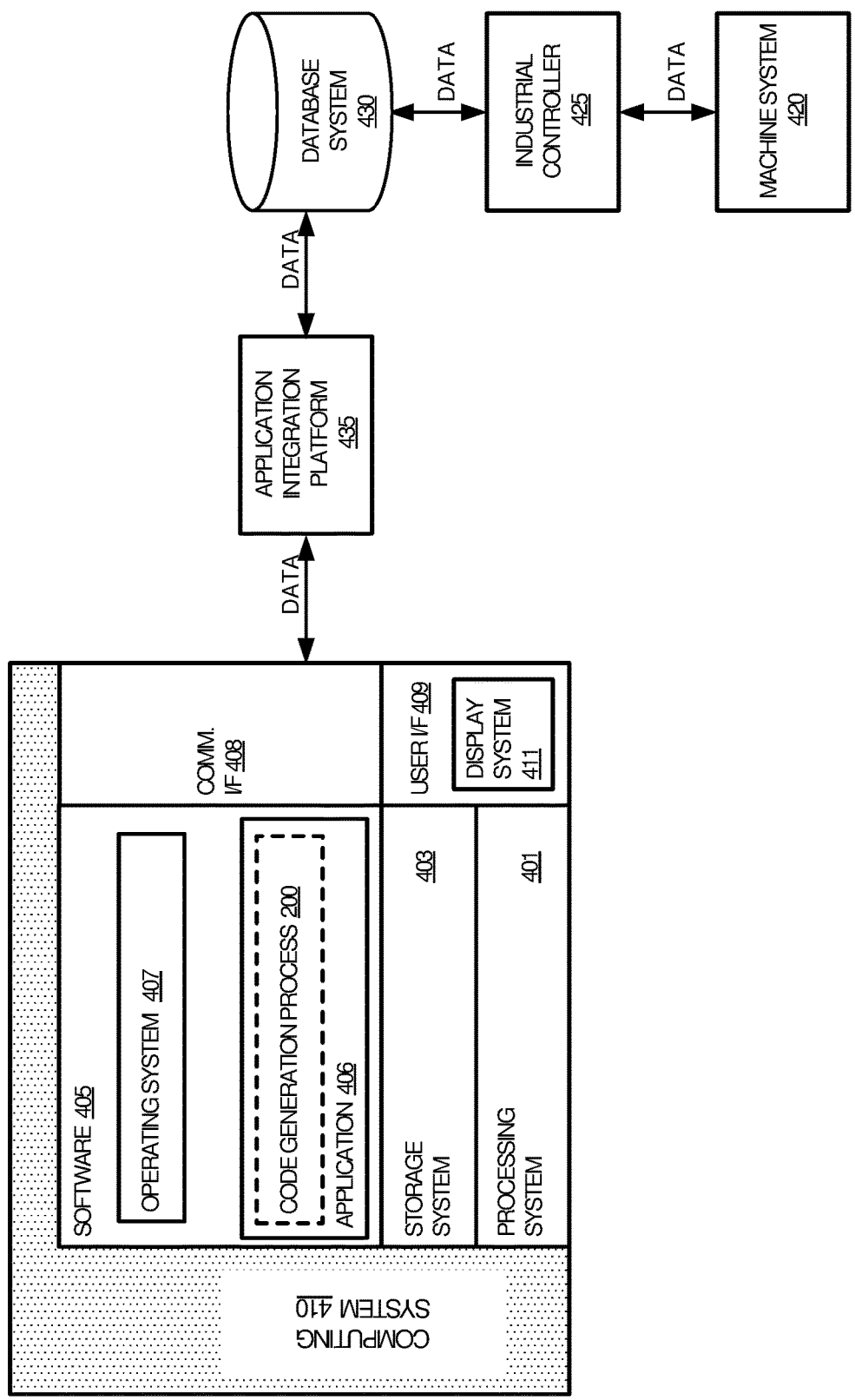
FIG. 4 is a block diagram that illustrates an operational scenario involving a computing system in an industrial automation environment in an exemplary implementation.
Figure 5:
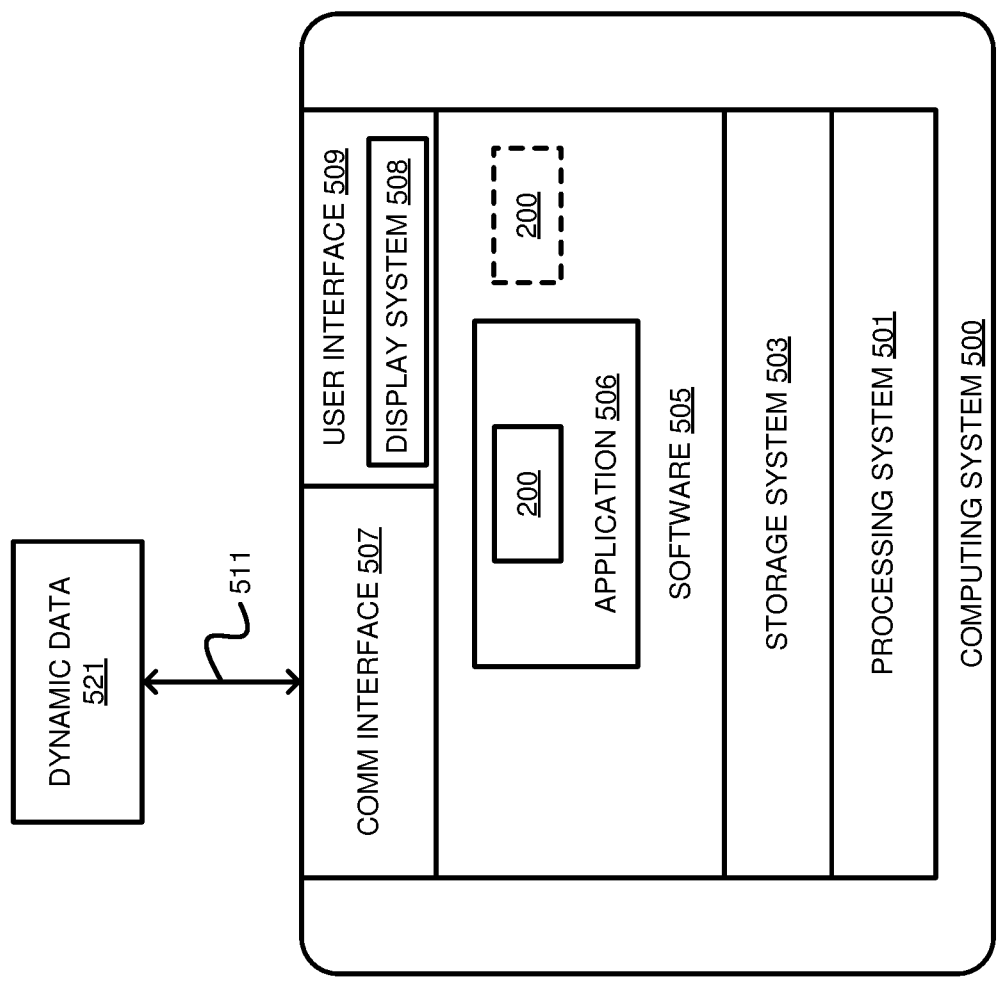
FIG. 5 is a block diagram that illustrates a computing system in an exemplary implementation.

Referring now to the drawings, FIG. 1 illustrates a communication system that may be employed to facilitate generation of controller application code that emulates the functionality of an industrial controller. FIG. 2 is a flow diagram that illustrates a code generation process that may be performed by a computing system. FIG. 3 illustrates an operational scenario involving a cloud-based communication system in an exemplary implementation. FIG. 4 illustrates an exemplary industrial automation environment that includes a computing system that may be used to execute a code generation process, and FIG. 5 illustrates an exemplary computing system that may be used to perform any of the code generation processes and operational scenarios described herein.

Turning now to FIG. 1, communication system 100 is illustrated in an exemplary implementation. Communication system 100 includes computing system 101, communication network 120, industrial controller 130, and machine system 140. Computing system 101 and communication network 120 communicate over communication link 121, while communication network 120 and industrial controller 130 are in communication over communication link 131. Industrial controller 130 and machine system 140 communicate over communication link 141. In some examples, communication network 120 could comprise an on-premise private network or private cloud accessible over a local network connection, a public cloud-based environment accessible over a wide area network such as the Internet, a direct connection such as a bus or serial link, or any other data communication technique, including combinations thereof.

In operation, industrial controller 130 executes control logic code to operate machine system 140. Computing system 101 connects to industrial controller 130 and monitors and records the various input and output states of industrial controller 130 during operation. Computing system 101 may also timestamp the input and output states that it records in order to capture this timing data. Computing system 101 then performs a deep analysis on the data observed from monitoring the operation of industrial controller 130 while controlling machine system 140 to generate a functional design specification that describes these operations. In at least one implementation, computing system 101 may utilize artificial intelligence and machine learning techniques to perform this analysis on the recorded input and output data. The functional design specification can then be used by computing system 101 to generate application program code that emulates the operations of industrial controller 130 for controlling machine system 140. The generated program code may then be used to drive a newer controller system that can replace industrial controller 130. An exemplary operation of computing system 101 will now be described in greater detail with respect to FIG. 2.

FIG. 2 is a flow diagram that illustrates an operation 200 of a computing system in an exemplary implementation. The operation 200 shown in FIG. 2 may also be referred to as code generation process 200 herein. The steps of the operation are indicated below parenthetically. The following discussion of operation 200 will proceed with reference to computing system 101 and industrial controller 120 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate generation of controller application code that emulates functionality of an industrial controller. However, operation 200 could also be employed by a computing system to facilitate code generation for any software application irrespective of its purpose or functionality, including embedded control systems, simulation software, black-box systems, or any other application.

As shown in the operational flow of process 200, computing system 101 interfaces with industrial controller 130 and monitors input and output states of industrial controller 130 while industrial controller 130 operates machine system 140 (201). Computing system 101 may interface with industrial controller 130 over any kind of communication link or network, including local area networks, cloud networks, and direct data connections between industrial controller 130 and computing system 101, and any combination thereof. In at least one implementation, computing system 101 could tap directly into the input and output channels of industrial controller 130 in order to interface with controller 130. For example, computing system 101 could comprise a data collection system having as many input points with time-stamps as the combined number of inputs and outputs of industrial controller 130, and computing system 101 could interface with controller 130 by linking all of the input points of computing system 101 to the inputs and outputs of controller 130. Computing system 101 could then execute an input and output data logging routine to monitor and record the input and output states of industrial controller 130 while industrial controller 130 operates machine system 140. The input or output data could be captured, time stamped, and recorded as triggered on every input or output change of state exhibited by industrial controller 130. Further, in some implementations, signal compatibility issues, electrical interface problems, synchronization, disruption, interference, and other such concerns may be addressed and compensated for by computing system 101 when capturing the input and output signals of controller 130.

Computing system 101 analyzes the input and output states of industrial controller 130 used to operate machine system 140 to generate a functional design specification for industrial controller 130 (202). The functional design specification compiles all of the functionality of industrial controller 130 observed by computing system 101 while monitoring the input and output states of industrial controller 130 as controller 130 operates machine system 140. In some examples, the functional design specification could include specific functionality that describes how industrial controller 130 operates machine system 140 in response to a given input. In order to analyze the input and output states of industrial controller 130, computing system 101 could detect changes of the input and output states of industrial controller 130 while industrial controller 130 operates machine system 140 over time. Computing system 101 may also analyze the input and output states of industrial controller 130 using artificial intelligence and machine learning algorithms. In some implementations, computing system 101 could analyze the input and output states of industrial controller 130 by utilizing cloud services to analyze the input and output states of industrial controller 130. For example, computing system 101 could comprise a data analysis server in a cloud computing environment that may perform some or all of the analysis on the input and output states of industrial controller 130 to generate the functional design specification.

Computing system 101 generates the controller application code that emulates the functionality of industrial controller 130 based on the functional design specification (203). For example, computing system 101 generates the controller application code based on the functional design specification that describes all of the input and output states of industrial controller 130 while controller 130 operates machine system 140 over time. In some examples, computing system 101 generates the controller application code by utilizing standard code libraries, which could include standard automation sequences such as start and stop, forward and reverse, binary-coded decimal to decimal conversions, and the like. Computing system 101 could use other libraries such as subsystems, instruction set conversions, predefined code blocks for new controller systems such as add-on instructions, and any other program code resources. For example, computing system 101 could attempt to identify subsystems and modules in the captured input and output data that exhibit the behavior and functionality of a particular automation sequence, predefined code block, or any other standard library function that can then be used to generate the code for that functionality. In some examples, computing system 101 could comprise a data analysis server in a cloud computing environment that may generate some or all of the controller application code that emulates the functionality of industrial controller 130 based on the functional design specification. Further, in at least one implementation, computing system 101 could be configured to validate the controller application code by comparing the output states of industrial controller 130 to output produced from operating machine system 140 using the controller application code. For example, the controller application code generated by computing system 101 could be loaded and executed on a new controller system intended to replace industrial controller 130, and the output produced from operating machine system 140 using the controller application code executing on the new controller system could be compared to the output states of industrial controller 130 to validate how accurately the controller application code is emulating the functionality of industrial controller 130.

Advantageously, computing system 101 is able to autonomously generate controller application code that emulates the functionality of industrial controller 130. By interfacing with industrial controller 130 and monitoring and analyzing the input and output states of industrial controller 130 while controller 130 operates machine system 140, computing system 101 can generate a functional design specification for industrial controller 130 that may be used to generate the controller program code. In this manner, the techniques described herein provide the technical advantage of assisting owners of industrial controller 130 in migrating to newer controller systems that may execute the generated controller application code. Another exemplary operation of a communication system will now be discussed with respect to FIG. 3.

FIG. 3 illustrates an operation of communication system 300 in an exemplary embodiment. Communication system 300 provides an example of communication system 100, although system 100 could use alternative configurations. The following operations could be executed by computing system 101 and other elements of communication system 100, and could also be combined with operation 200 of FIG. 2 in some implementations.

Communication system 300 includes computing system 301, cloud network 320, and logic controller 330. Logic controller 330 provides an example of industrial controller 130, but controller 130 could use alternative configurations. In this example, logic controller 330 represents an older control system that the owner desires to replace with a more modern system. However, the program code that runs on logic controller 330 is locked and inaccessible, so migration to the newer system is difficult and time consuming, and would require a significant amount of human work hours to research the operations of controller 330 and possibly rewrite the program code for the new replacement controller. Instead, the techniques disclosed herein provide for autonomous generation of controller program code by observing the operation of controller 330 and employing machine learning algorithms.

In operation, logic controller 330 executes control logic code, which scans and processes the inputs and then updates the outputs. Control signals are then sent out which drive the operation of a machine. While logic controller 330 is running and controlling the machine, computing system 301 records and timestamps the input and output states of logic controller 330. In some examples, computing system 301 could comprise a data collection system with input points that may be individually timestamped and are in sufficient quantity to accommodate the sum of inputs and outputs of the target system, which is logic controller 330 in this example. The data collection system running on computing system 301 would execute an input and output logging routing to capture the operational data of logic controller 330. Capture and timestamping is triggered on input and output state changes while logic controller 330 is executing the control logic to drive the machine. Of course, complexity increases with the number of inputs and outputs, the use of analog signals, motion control, and other considerations. In addition, signal compatibility issues may arise on the interface between computing system 301 and logic controller 330 that may need to be compensated for, such as electrical interface problems, synchronization issues, disruption, interference, and any other signal complications.

Network communications, point-to-point communications, or any other form of communication performed by logic controller 330, such as communications to another programmable logic controller (PLC), distributed control system (DCS), human-machine interface (HMI), or supervisory control and data acquisition (SCADA) systems, would require additional hardware and configuration to capture. One solution could include installing multiple interface cards into computing system 301, such as RS-232, RS-485, Ethernet, process field bus (PROFIBUS), controller area network (CAN) bus, and the like, plus sniffer and protocol analysis software tools to catch the input and output points, or "tags", be sent over these communication channels. These "tags" can then be recorded along with the input and output signals. Both data collection systems must be synchronized.

While logic controller 330 is running and computing system 301 is monitoring and recording the input and output states, there may be certain failure modes, error handling code, and other functionality of the control logic executing on controller 330 that does not occur frequently, and thus may not be captured and modeled by computing system 301. One solution to this problem includes computing system 301 generating a report of inputs that were not active during the monitored period, which will require manual intervention to "force" special working modes or failures. In addition, computing system 301 could generate a report of different input combinations that were not captured during the monitored period, which would also require manual intervention for testing these use cases. However, computing system 301 could be configured to monitor and record the input and output states of logic controller 330 over a long enough time period to ensure that all working modes, failures, error handling, and any other functionality are eventually triggered and captured by computing system 301.

Once the input and output state data is captured and recorded, in this example computing system 301 transfers the data to a data analysis cloud service running in cloud network 320. The data analysis cloud service analyzes the input and output states using artificial intelligence, machine learning, and deep learning algorithms to generate a functional design specification for the control logic running on logic controller 330 and application logic code that emulates the operation of controller 330 as defined in the functional design specification. In order to increase readability of the generated code by human developers, the code could be generated using libraries for various standard functions and routines. For example, when analyzing the input and output states, the cloud service could identify behavior in the input and output data that may be attributed to various subsystems and modules, such as a conveyor, wrapper, motor, extruder, or any other machine components. Predefined logic controller code blocks, such as add-on instructions, could then be used for the identified subsystems and modules. Further, the analysis could detect basic automation sequences, such as starting or stopping a machine, moving forward or reverse, binary-coded decimal to decimal conversions, and any other standard automation routines, and then utilize code from standard libraries to provide these functions when generating the controller application code. The instruction set of the target controller 330 could be converted or translated into the instruction set of the new controller replacing it, which could reduce the analysis on input and output combinations and instead enable searching for equivalent instructions in the newly generated code. Any of these standard libraries can be grown by external human contributions and machine learning techniques.

Beneficially, the techniques disclosed herein provide for machine logic characterization and modeling by analyzing the change of input and output states over time on the control system while it controls a machine system. By applying artificial intelligence and machine learning algorithms to perform the analysis, the system is able to autonomously create a functional design specification and controller application code that mimics the functionality of an existing obsolete control system. Further, by having a single data collection and emulation system that can compare target system output and emulated system output, fully automated feedback about the correctness of their decisions may be provided to the artificial intelligence and machine learning systems, thereby allowing these systems to learn and improve their accuracy over time.

Referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network. In some examples, computing system 101 could comprise a ControlLogix® control system provided by Rockwell Automation, Inc.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, packet networks, wireless mesh networks (WMN), local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Industrial controller 130 generally comprises a processing system and communication transceiver. Industrial controller 130 may reside in a single device or may be distributed across multiple devices. Industrial controller 130 may be a discrete system or may be integrated within other systems, including other systems within communication system 100 or an automation control system. In some examples, industrial controller 130 could comprise automation controllers, programmable logic controllers (PLCs), programmable automation controllers (PACs), or any other controllers used in automation control. In some implementations, a PLC, PAC, and/or specific modules within a PLC rack could provide some or all of the functionality described herein for industrial controller 130.

Machine system 140 could comprise any machinery or equipment used in industrial automation. In some examples, machine system 140 could comprise a sensor, drive, pump, filter, drill, motor, robot, fabrication machinery, mill, printer, or any other industrial automation equipment. Additionally, machine system 140 could comprise other industrial equipment, such as a brew kettle in a brewery, a reserve of coal or other resources, or any other element that may reside in an industrial automation environment. Although shown separately in FIG. 1, in at least one implementation machine system 140 could comprise industrial controller 130 or portions thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format, including combinations thereof. Communication links 121, 131, and 141 could be direct links or may include intermediate networks, systems, or devices.

Turning now to FIG. 4, a block diagram that illustrates an industrial automation environment 400 in an exemplary implementation is shown. Industrial automation environment 400 provides an example of an industrial automation environment that may be utilized to implement the code generation processes disclosed herein, but other environments could also be used. Industrial automation environment 400 includes computing system 410, machine system 420, industrial controller 425, database system 430, and application integration platform 435. Computing system 410 provides an example of computing systems 101 and 301, although systems 101 and 301 could use alternative configurations. Industrial controller 425 provides an example of industrial controller 130 and logic controller 330, although controllers 130 and 330 could use alterative configurations. Machine system 420 and controller 425 are in communication over a communication link, controller 425 and database system 430 communicate over a communication link, database system 430 and application integration platform 435 communicate over a communication link, and application integration platform 435 and computing system 410 are in communication over a communication link. Note that there would typically be many more machine systems in most industrial automation environments, but the number of machine systems shown in FIG. 4 has been restricted for clarity.

Industrial automation environment 400 comprises an automobile manufacturing factory, food processing plant, oil drilling operation, microprocessor fabrication facility, or some other type of industrial enterprise. Machine system 420 could comprise a sensor, drive, pump, filter, drill, motor, robot, fabrication machinery, mill, printer, or any other industrial automation equipment, including their associated control systems. A control system comprises, for example, industrial controller 425, which could include automation controllers, programmable logic controllers (PLCs), programmable automation controllers (PACs), or any other controllers used in automation control. Additionally, machine system 420 could comprise other industrial equipment, such as a brew kettle in a brewery, a reserve of coal or other resources, or any other element that may reside in an industrial automation environment 400.

Machine system 420 continually produces operational data over time. The operational data indicates the current status of machine system 420, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 420 and/or controller 425 is capable of transferring the operational data over a communication link to database system 430, application integration platform 435, and computing system 410, typically via a communication network. Database system 430 could comprise a disk, tape, integrated circuit, server, or some other memory device. Database system 430 may reside in a single device or may be distributed among multiple memory devices.

Application integration platform 435 comprises a processing system and a communication transceiver. Application integration platform 435 may also include other components such as a router, server, data storage system, and power supply. Application integration platform 435 may reside in a single device or may be distributed across multiple devices. Application integration platform 435 may be a discrete system or may be integrated within other systems—including other systems within industrial automation environment 400. In some examples, application integration platform 435 could comprise a FactoryTalk® VantagePoint server system provided by Rockwell Automation, Inc.

The communication links over which data is exchanged between machine system 420, industrial controller 425, database system 430, application integration platform 435, and communication interface 408 of computing system 410 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 410 may be representative of any computing apparatus, system, or systems on which the data collection processes disclosed herein or variations thereof may be suitably implemented. Computing system 410 provides an example of a computing system that could be used as a either a server or a client device in some implementations, although such devices could have alternative configurations. Examples of computing system 410 include mobile computing devices, such as cell phones, tablet computers, laptop computers, notebook computers, and gaming devices, as well as any other type of mobile computing devices and any combination or variation thereof. Examples of computing system 410 also include desktop computers, server computers, and virtual machines, as well as any other type of computing system, variation, or combination thereof. In some implementations, computing system 410 could comprise a mobile device capable of operating in a server-like fashion which, among other uses, could be utilized in a wireless mesh network.

Computing system 410 includes processing system 401, storage system 403, software 405, communication interface 408, and user interface 409. Processing system 401 is operatively coupled with storage system 403, communication interface 408, and user interface 409. Processing system 401 loads and executes software 405 from storage system 403. Software 405 includes application 406 and operating system 407. Application 406 may include code generation process 200 in some examples, as indicated by the dashed line in FIG. 4. When executed by computing system 410 in general, and processing system 401 in particular, software 405 directs computing system 410 to operate as described herein for code generation process 200 or variations thereof. In this example, user interface 409 includes display system 411, which itself may be part of a touch screen that also accepts user inputs via touches on its surface. Computing system 410 may optionally include additional devices, features, or functionality not discussed here for purposes of brevity.

Turning now to FIG. 5, a block diagram is shown that illustrates computing system 500 in an exemplary implementation. Computing system 500 provides an example of computing systems 101 and 301, or any computing system that may be used to execute code generation process 200 or variations thereof, although systems 101 and 301 could use alternative configurations. Computing system 500 includes processing system 501, storage system 503, software 505, communication interface 507, and user interface 509. User interface 509 comprises display system 508. Software 505 includes application 506 which itself includes code generation process 200. Code generation process 200 may optionally be implemented separately from application 506, as indicated by the dashed line in FIG. 5.

Computing system 500 may be representative of any computing apparatus, system, or systems on which application 506 and code generation process 200 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for code generation process 200 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer readable media or storage media readable by processing system 501 and capable of storing software 505. Storage system 503 may include volatile and nonvolatile, removable and non-removable media implemented in any method or technology for storage of information, such as computer readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 509, processing system 501 may load and execute portions of software 505, such as code generation process 200, to render a graphical user interface for application 506 for display by display system 508 of user interface 509. Software 505 may be implemented in program instructions and among other functions may, when executed by computing system 500 in general or processing system 501 in particular, direct computing system 500 or processing system 501 to interface with an industrial controller and monitor input and output states of the industrial controller while the industrial controller operates a machine system. Software 505 may further direct computing system 500 or processing system 501 to analyze the input and output states of the industrial controller used to operate the machine system to generate a functional design specification for the industrial controller. In addition, software 505 directs computing system 500 or processing system 501 to generate controller application code that emulates the functionality of the industrial controller based on the functional design specification.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501.

In general, software 505 may, when loaded into processing system 501 and executed, transform computing system 500 overall from a general-purpose computing system into a special-purpose computing system customized to facilitate generation of controller application code that emulates functionality of an industrial controller as described herein for each implementation. For example, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage.

In some examples, if the computer-storage media are implemented as semiconductor-based memory, software 505 may transform the physical state of the semiconductor memory when the program is encoded therein. For example, software 505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 505 is deployed and executed in order to implement application 506 and/or code generation process 200 (and variations thereof). However, computing system 500 may also represent any computing system on which software 505 may be staged and from where software 505 may be distributed, transported, downloaded, or otherwise provided to yet another computing system for deployment and execution, or yet additional distribution. For example, computing system 500 could be configured to deploy software 505 over the internet to one or more client computing systems for execution thereon, such as in a cloud-based deployment scenario.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as display system 508, speakers, haptic devices, and other types of output devices may also be included in user interface 509. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer-readable medium having stored thereon instructions that, in response to execution, cause a system comprising a processor to perform operations, the operations comprising:
    monitoring input and output states of an industrial controller while the industrial controller operates a machine system;
    generating, based at least on the input and output states, a functional design specification;
    identifying, based at least on a behavior of the input and output states, a subsystem;
    autonomously generating, based at least on the functional design specification, a library comprising a standard function of the subsystem, and a standard code library, controller application code that emulates functionality of the industrial controller, wherein the library is distinguished from the standard code library; and
    operating the machine system using the controller application code.

2. The non-transitory computer-readable medium of claim 1 wherein the operations further comprise determining relationships between the input and output states, wherein the functional design specification is further based on the relationships between the input and output states.

3. The non-transitory computer-readable medium of claim 1 wherein the operations further comprise analyzing the input and output states using artificial intelligence and machine learning algorithms.

4. The non-transitory computer-readable medium of claim 1 wherein the operations further comprise analyzing the input and output states via cloud services.

5. The non-transitory computer-readable medium of claim 1 wherein the operations further comprise validating the controller application code by comparing the output states to output produced from operating the machine system using the controller application code.

6. The non-transitory computer-readable medium of claim 1 wherein the operations further comprise:
    identifying an input that was not active during a period in which the industrial controller operated the machine system; and
    generating a report including at least the input.

7. The non-transitory computer-readable medium of claim 1 wherein the standard code library includes standard automation sequences.

8. A method for generating controller application code that emulates functionality of an industrial controller, the method comprising:
    monitoring, by a system comprising a processor, input and output states of the industrial controller while the industrial controller operates a machine system;
    generating, by the system and based at least on the input and output states, a functional design specification;
    identifying, based at least on a behavior of the input and output states, a subsystem;
    autonomously generating, by the system and based at least on the functional design specification, a library comprising a standard function of the subsystem, and a standard code library, controller application code that emulates the functionality of the industrial controller, wherein the library is distinguished from the standard code library; and
    operating the machine system using the controller application code.

9. The method of claim 8 further comprising detecting, by the system, changes of the input and output states while the industrial controller operates the machine system over time.

10. The method of claim 8 further comprising analyzing, by the system, the input and output states using artificial intelligence and machine learning algorithms.

11. The method of claim 8 further comprising analyzing, by the system, the input and output states via cloud services.

12. The method of claim 8 further comprising validating, by the system, the controller application code by comparing the output states to output produced from operating the machine system using the controller application code.

13. The method of claim 8 further comprising:
identifying an input that was not active during a period in which the industrial controller operated the machine system; and
generating a report including at least the input.

14. The method of claim 8 wherein the standard code library includes standard automation sequences.

15. An apparatus for generating controller application code that emulates functionality of an industrial controller, the apparatus comprising:
one or more computer-readable storage media; and
program instructions stored on the one or more computer-readable storage media that, when executed by a processing system, direct the processing system to at least:
monitor input and output states of the industrial controller while the industrial controller operates a machine system;
generate, based at least on the input and output states, a functional design specification;
identify, based at least on a behavior of the input and output states, a subsystem;
autonomously generate, based at least on the functional design specification, a library comprising a standard function of the subsystem, and a standard code library, controller application code that emulates the functionality of the industrial controller, wherein the library is distinguished from the standard code library; and
operating the machine system using the controller application code.

16. The apparatus of claim 15 wherein the program instructions direct the processing system to detect changes of the input and output states while the industrial controller operates the machine system over time.

17. The apparatus of claim 15 wherein the program instructions direct the processing system to analyze the input and output states using artificial intelligence and machine learning algorithms.

18. The apparatus of claim 15 wherein the program instructions direct the processing system to analyze the input and output states by utilizing cloud services.

19. The apparatus of claim 15 wherein the program instructions further direct the processing system to validate the controller application code by comparing the output states to output produced from operating the machine system using the controller application code.

20. The apparatus of claim 15 wherein the program instructions further direct the processing system to:
identify an input that was not active during a period in which the industrial controller operated the machine system; and
generate a report including at least the input.

* * * * *